United States Patent
Le Borgne

(10) Patent No.: US 7,234,590 B1
(45) Date of Patent: Jun. 26, 2007

(54) ERGONOMIC LOAD TABLE FOR WASHERS

(75) Inventor: Dominique Le Borgne, Outremont Montreal (CA)

(73) Assignee: Steris Inc., Temecula, CA (US)

( * ) Notice: Subject to any disclaimer, the term of this patent is extended or adjusted under 35 U.S.C. 154(b) by 0 days.

(21) Appl. No.: 11/325,190

(22) Filed: Jan. 4, 2006

(51) Int. Cl.
*B65G 21/10* (2006.01)

(52) U.S. Cl. .................................. 198/861.5; 198/592

(58) Field of Classification Search .............. 198/592, 198/861.1, 861.3, 861.5, 589, 632
See application file for complete search history.

(56) References Cited

U.S. PATENT DOCUMENTS

| | | | |
|---|---|---|---|
| 2,840,041 A | 6/1958 | Fleming | 119/845 |
| 2,870,922 A * | 1/1959 | Thomson | 198/592 |
| 4,023,531 A | 5/1977 | Thompson | 119/22 |
| 4,206,720 A | 6/1980 | Ruggeri et al. | 119/17 |
| 4,522,046 A | 6/1985 | Dreher | 68/27 |
| 4,754,867 A * | 7/1988 | De Anda | 198/861.5 |
| 5,172,804 A * | 12/1992 | Chersin | 198/861.5 |
| 5,470,194 A | 11/1995 | Zegers | 414/786 |
| 5,553,988 A | 9/1996 | Horn et al. | 414/416 |
| 5,655,647 A * | 8/1997 | Wheeler | 198/861.5 |
| 5,735,664 A | 4/1998 | Jerome | 414/393 |
| 5,771,840 A | 6/1998 | Pelletier | 119/452 |
| 5,902,089 A | 5/1999 | Sinn et al. | 414/398 |
| 5,913,655 A * | 6/1999 | Maday | 198/592 |
| 6,447,234 B2 | 9/2002 | Sinn et al. | 414/398 |
| 6,481,117 B2 | 11/2002 | Turatti | 34/164 |
| 6,484,869 B1 * | 11/2002 | Brouwer et al. | 198/592 |
| 6,553,939 B1 | 4/2003 | Austin et al. | 119/455 |
| 6,811,164 B2 | 11/2004 | Trogstam | 280/79.3 |
| 2001/0052192 A1 | 12/2001 | Turatti | 34/201 |

\* cited by examiner

*Primary Examiner*—James R. Bidwell
(74) *Attorney, Agent, or Firm*—Kusner & Jaffe; Michael A. Centanni

(57) ABSTRACT

A loading device for a tunnel washer having a primary conveyor for conveying articles to be washed through the tunnel washer. The loading device includes a frame having a pair of spaced apart legs attached thereto and a conveyor belt. The conveyor belt has an upper surface that is movable and defines a path from a first end to a second end. The loading device also includes an adjusting device for changing a height of the first end relative to the second end. The adjusting device is mounted to the pair legs at one end and is attached to the frame at another end. The second end of the upper surface is disposed adjacent to the tunnel washer and the legs are dimensioned such that the article can be discharged from the second end of the upper surface onto the primary conveyor of the tunnel washer.

20 Claims, 3 Drawing Sheets

ERGONOMIC LOAD TABLE FOR WASHERS

FIELD OF THE INVENTION

The present invention relates generally to the cleaning and decontaminating arts, and more particularly to washers for washing animal cages and associated apparatus.

BACKGROUND OF THE INVENTION

Some medical research facilities and pharmaceutical manufacturers keep large numbers of animals for testing purposes. Large numbers of cages are required to house the animals, and each cage must be cleaned periodically for the comfort and health of the animals. Because of the number of cages that need to be periodically cleaned, such facilities utilize washers for cleaning the animal cages. A typical washer used to clean animal cages is a tunnel washer.

Tunnel washers for cleaning animal cages are elongated structures that include a linear conveyor system, such as a belt type conveyor, for transporting the animal cages through one or more washing zones that are disposed along the length of the tunnel washer. Tunnel washers for cleaning animal cages are fixed and stationary. Tunnel washers for cleaning animal cages generally operate by directing jets or streams of fluid toward the animal cages from spray heads or nozzles located within the washer. The fluid is directed toward the animal cages(s) as the conveyor transports the animal cage(s) through the washing zones.

Operators that load animal cages into the tunnel washer work from work platforms that are also fixed and stationary. Prior to lifting an animal cage and placing it within the tunnel washer, an operator manually removes water bottles, feeding trays, bedding, and debris from each cage to be washed. Once the animal cage has been emptied, the operator inverts the cage and places it onto the conveyor at an entrance of the tunnel washer.

Repetitive motion, such as manual lifting and placing animal cages on a conveyor, can result in injury to a human operator. In order to reduce operator injuries, the National Institute for Occupational Safety and Health (NIOSH) has established guidelines to be used in designing manual lifting operations for industrial applications. The NIOSH guidelines indicate that the actual height of an operator's hands above a floor (i.e. "knuckle height") at the end of a lifting task is one factor that should be considered to make a task easier for an operator. According to NIOSH standards, an optimum knuckle height is dependent upon the height of each operator. The actual knuckle height, i.e. position of the operator's hands at the end of a particular lift, is determined by several work environment factors. Work environment factors relating to loading a tunnel washer include: the shape, size, and weight of the animal cage; placement and design of handholds upon the animal cage; and the height of the work surface on which the animal cage is to be placed.

One problem with loading a conventional tunnel washer is that an appropriate work surface height for one operator may not be appropriate for another operator. Therefore, the risk of repetitive use injuries cannot be minimized for loading a conventional tunnel washer.

The present invention addresses this and other problems and provides an apparatus and a method for ergonomically loading a tunnel washer.

SUMMARY OF THE INVENTION

In accordance with one embodiment of the present invention, there is provided a loading device for a tunnel washer having a primary conveyor for conveying articles to be washed through the tunnel washer. The loading device includes a frame having a pair of spaced apart legs attached thereto and a conveyor belt. The conveyor belt is supported by the frame and has an upper surface. The upper surface has a first end and a second end and defines a path. The upper surface is movable along the path from the first end to the second end. The loading device also includes an adjusting means for changing a height of the first end of the upper surface relative to the second end of the upper surface. The adjusting means has one end mounted to the pair of spaced apart legs and another end attached to the frame. The pair of spaced apart legs is dimensioned to support the frame relative to the tunnel washer such that the second end of the upper surface is generally equal in height to the primary conveyor of the tunnel washer. The second end of the upper surface is disposed adjacent to the tunnel washer and the legs are dimensioned such that the article can be discharged from the second end of the upper surface onto the primary conveyor of the tunnel washer.

In accordance with another embodiment of the present invention, there is provided a tunnel washer that includes a housing having a first end and a second end. The housing defines a washing chamber that is open at both the first end of the housing and the second end of the housing. The first end defines an entrance and the second end defines an exit. A plurality of spray nozzles for dispensing fluids is disposed in the washing chamber. The housing includes a primary conveyor wherein the primary conveyor is dimensioned to receive an animal cage from a loading table. The loading table includes a conveyance system that has a first end and a second end. The loading table also includes a generally continuous belt that moves around a pair of rollers disposed at the first end of the conveyance system and the second end of the conveyance system. The generally continuous belt defines a path. The conveyance system is dimensioned such that the animal cage can be conveyed along the path from the first end of the conveyance system to the second end of the conveyance system. The second end of the conveyance system is dimensioned such that the animal cage can be discharged from the second end of the conveyance system onto the primary conveyor. The conveyance system is mounted such that the first end is movable relative to the second end.

An advantage of the present invention is a loading table that has an adjustable height.

Another advantage of the present invention is a loading table as defined above that can be utilized in conjunction with a tunnel washer.

Yet another advantage of the present invention is a loading table as defined above that is operable to reduce operator injuries.

Still another advantage of the present invention is a loading table as defined above that is adjustable by an operator.

A further advantage of the present invention is a loading table as defined above that can be quickly adjusted.

A further advantage of the present invention is a loading table as defined above that can be added to an existing tunnel washer.

These and other advantages will become apparent from the following description of a preferred embodiment taken together with the accompanying drawings and the appended claims.

BRIEF DESCRIPTION OF THE FIGURES

The invention may take physical form in certain parts and arrangement of parts, a preferred embodiment of which will be described in detail in the specification and illustrated in the accompanying drawings which form a part hereof, and wherein.

DETAILED DESCRIPTION OF A PREFERRED EMBODIMENT

Figure 1:
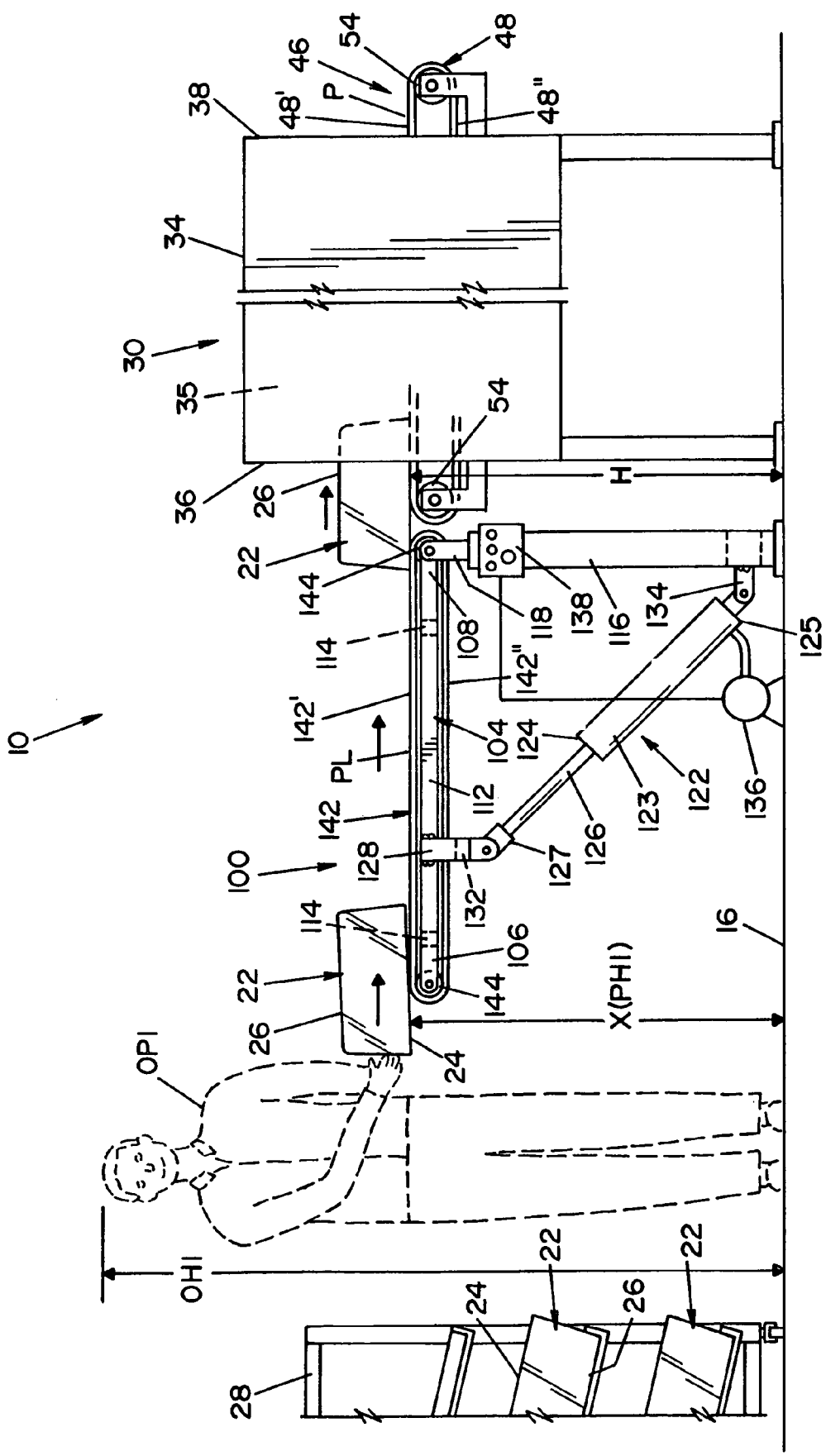
FIG. 1 is a side, elevational view of an ergonomic loading table for a washer, illustrating a preferred embodiment and showing a first position thereof.

Referring now to the drawings wherein the showings are for the purpose of illustrating a preferred embodiment of the invention only, and not for the purpose of limiting same, FIG. 1 shows an animal cage washing system 10, having a loading table 100, according to a preferred embodiment of the present invention. Broadly stated, loading table 100 provides an adjustable-height loading surface for loading animal cages into a tunnel washer 30.

Figure 2:
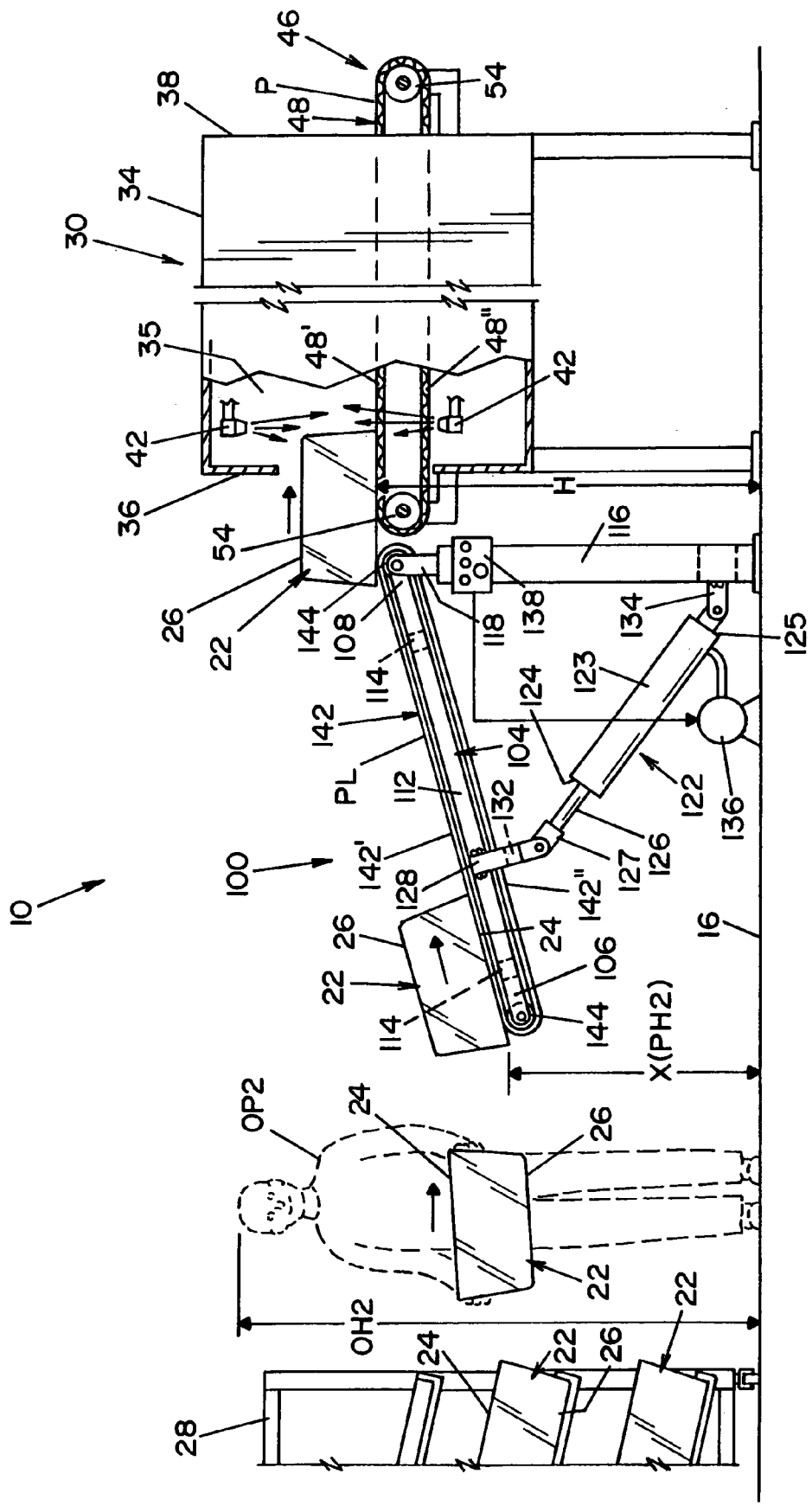
FIG. 2 is a side, elevational view of the ergonomic loading table for a washer, illustrating a preferred embodiment and showing a second position thereof.
Figure 3:
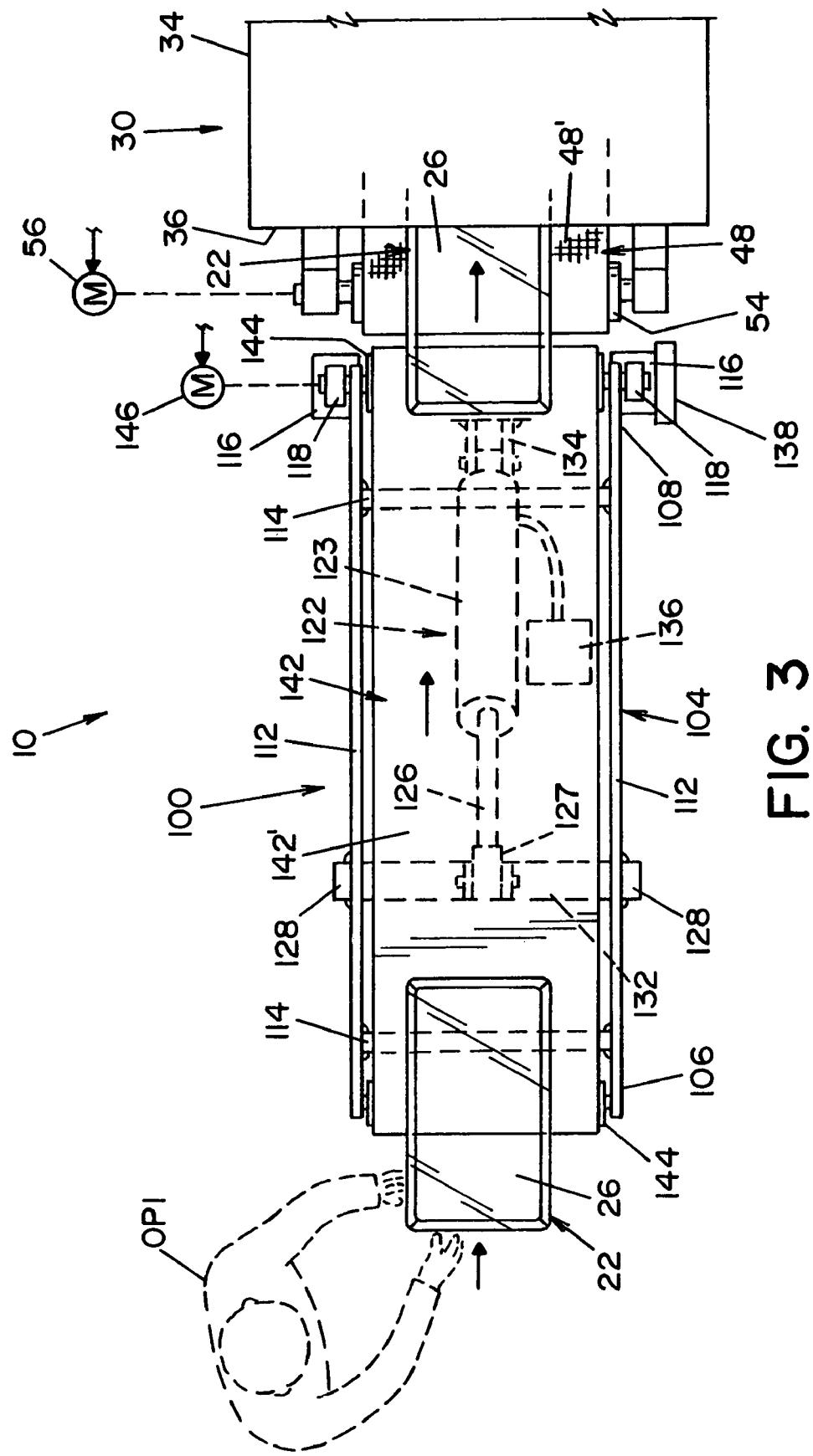
FIG. 3 is a top plan view of the ergonomic loading table shown in FIG. 1.

Tunnel washer 30 is best seen in FIGS. 1-3. Tunnel washer 30 is of a type as described in U.S. Pat. No. 5,771,840 entitled APPARATUS FOR RIGHTING ANIMAL CAGES DISCHARGE FROM A WASHING DEVICE, hereby incorporated herein by reference. Tunnel washer 30 includes a housing 34 that has a first end 36 and a second end 38. Housing 34 defines a washing chamber 35 that is open at both first end 36 and second end 38. First end 36 defines an entrance and is dimensioned to receive animal cages from loading table 100. Second end 38 defines an exit and is dimensioned to discharge animal cages from tunnel washer 30. A plurality of spray nozzles 42 for dispensing washing fluids, rinsing fluids, and/or drying fluids such as air, are disposed within washing chamber 35 of housing 34.

A generally horizontal primary conveyor system 46 is also disposed within housing 34 to extend through washing chamber 35. Conveyor system 46 includes a generally endless conveyor belt 48 that is movable over a pair of rollers 54. Rollers 54 are spaced-apart, parallel, and are driven by drive means 56. Conveyor belt 48 has an upper belt run 48' and a lower belt run 48". Upper belt run 48' is disposed at a fixed height H relative to a support surface that, in the embodiment shown, is a floor 16. Upper belt run 48' defines a path P along which an animal cage 22 is conveyed through housing 34 of tunnel washer 30.

Loading table 100 includes a frame 104. Frame 104 has a first end 106 and a second end 108. Frame 104 includes two spaced-apart side rails 112 and two transverse rails 114. Side rails 112 extend from first end 106 to second end 108 of frame 104. Transverse rails 114 extend between side rails 112 at the ends thereof. Two, spaced-apart legs 116 extend from frame 104 at second end 108. Each leg 116 has one end that engages floor 16 and another end having a bracket 118 attached thereto. Second end 108 of frame 104 is pivotally mounted to legs 116, wherein, each side rail 112 of frame 104 has one end that is pivotally attached to one of brackets 118.

Loading table 100 includes a conveyance system having a generally endless conveyor belt 142. Conveyor belt 142 is movable over a pair of rollers 144 that are supported by side rails 112 at the distal ends thereof. Rollers 144 are spaced apart and parallel to each other. Preferably, additional support rollers (not shown) are disposed between rollers 144. Rollers 144 are driven by drive means 146 shown schematically in FIG. 3. Conveyor belt 142 has an upper belt run 142' and a lower belt run 142". Upper belt run 142' defines a path PL, i.e., a conveyance surface, from first end 106 to second end 108 of frame 104. Conveyor belt 142 is preferably formed of an elastomeric material. By way of example and not limitation, conveyor belt 142 may be formed of the following or a combination thereof: nylon, rubber, and metal material.

Legs 116 are dimensioned such that second end 108 of frame 104, more specifically, upper belt run 142' of conveyor belt 142, is disposed at a height such that animal cage 22 can be discharged onto upper belt run 48' of conveyor belt 48.

Loading table 100 includes adjusting means 122 for adjusting the position and a height X of first end 106. In the illustrated embodiment, adjusting means 122 is a hydraulic cylinder. Adjusting means 122 includes a cylinder 123 and a shaft 126. Shaft 126 is disposed within cylinder 123 and has a first end 127 that extends from a first end 124 of cylinder 123. A pair of brackets 128 is attached to frame 104 at first end 106 of frame 104. A cross bar 132, best seen in FIG. 3, connects each bracket 128 to each other. First end 127 of shaft 126 is pivotally attached to cross bar 132. Cylinder 123 has a second end 125 that is pivotally attached to a bracket 134. Bracket 134 is attached to legs 116.

A pump 136 is fluidly connected to cylinder 123 for actuating adjusting means 122 i.e., hydraulic cylinder, as is conventionally known. An operator interface (control panel) 138 for operating pump 136 is attached to one of legs 116. Operator interface 138 is electrically connected to pump 136.

By way of example and not limitation, it is appreciated that in other embodiments, adjusting means 122 is may be comprised of a pneumatic cylinder, a mechanical means such as a screw drive, a rack and pinion, and an adjustable support that includes guide shafts having mechanical locking devices.

The present invention shall now be further described with reference to the operation of system 10. FIG. 1 shows system 10 and an operator OP1 having a height OH1. An animal cage 22 to be cleaned is typically delivered to operator OP1 on a rack 28. Animal cage 22 includes a top 24 and a bottom 26. In the illustrated embodiment, rack 28 is provided for storing and transporting animal cage 22. When placed on loading table 100, animal cage 22 is inverted. Prior to washing operator OP1 removes all accessories (not shown) from within animal cage 22. Such accessories may include water bottles, food, food trays, nest boxes, and other items. Operator OP1 then removes animal cage 22 from rack 28 and inverts animal cage 22 such that bedding and other debris remaining within animal cage 22 are dumped therefrom. While animal cage 22 is inverted, i.e. upside down, operator OP1 places animal cage 22 onto upper belt run 142' of loading table 100. During operation of system 10, conveyor belt 142 of loading table 100 is moving. After animal cage 22 is placed upon upper belt run 142', conveyor belt 142 transports animal cage along path PL until animal cage 22 is discharged onto upper belt run 48' of washer conveyor system 46. Animal cage 22 is then transported through housing 34 along path P of washer conveyor system 46.

When loading table 100 is generally horizontal, conveyor belt 142 is generally horizontal and upper belt run 142' is substantially coplanar with upper belt run 48' of conveyor belt 48. As used herein, the term "preferred height" refers to the ideal preferred working height X that is most appropriate for a particular operator given the operator's stature and the work environment. As discussed above, the "preferred height" is influenced by the shape, size, and weight of the animal cage, the placement and design of handholds upon the animal cage, and the height X of upper belt run 142' on which the animal cage is to be placed. As shown in FIG. 1, operator OP1 has selected a first preferred height PH1 that is appropriate for operator OP1.

Referring now to FIG. 2, system 10 is shown with an operator OP2 having a height OH2. Operator OP2 is of shorter stature than operator OP1 and OH2 is less than OH1. Accordingly, operator OP2 has a second preferred height PH2 that is less than first preferred height PH1. Height X is adjusted to preferred height PH2 by operation of adjusting means 122 as follows. Operator interface 138 is operable to receive the operator's input regarding the desired preferred height PH and to actuate pump 136 such that adjusting means 122 is actuated to change preferred height PH accordingly. As discussed above, adjusting means 122 can be extended or shortened by moving shaft 126 relative to cylinder 123. By extending or shortening adjusting means 122, loading table 100 is made to pivot about second end 108 causing first end 106 to move away from, or toward, floor 16. In this manner, operator OP2 is able to adjust height X to preferred height PH2.

As discussed above, an operator can adjust the height X of first end 106 such that height X is equal to a preferred height that it is appropriate for that operator's height. However, during the course of a workday, cages of different sizes may be delivered to an operator. As a result, the operator may determine that the preferred height PH has changed and height X is changed accordingly. The cage height is one of the work environment factors that may change the operator's preferred height. An operator could determine that the preferred height is changed as the result of a change in a work environment factor other than the animal cage height. In response to these changes, the operator can quickly adjust height X, and therefore preferred height PH, accordingly.

The foregoing is a preferred embodiment of the present invention. It should be appreciated that this embodiment is described for purposes of illustration only, and that those skilled in the art may practice numerous alterations and modifications without departing from the spirit and scope of the invention. It is intended that all such modifications and alterations be included insofar as they come within the scope of the invention as claimed or the equivalents thereof.

Having described the invention, the following is claimed:

1. A loading device for a tunnel washer having a washer conveyor for conveying articles therethrough, said loading device comprising:
   conveyance means including:
      a frame having a first end and a second end, said frame including a pair of side rails having fixed length and a pair of transverse rails extending between the pair of side rails, wherein said frame has a fixed length between the first and second ends,
      first and second rollers supported by the frame, and
      a conveyor belt mounted around said first and second rollers to convey articles along a travel path extending between the first and second ends of the frame;
   support means for supporting said conveyance means, the support means including:
      a pair of stationary spaced-apart legs having a fixed height, said legs supporting the second end of the frame at a height substantially equal to a height of the washer conveyer, wherein the second end of the frame is pivotally connected with the legs, and
      a bracket extending between said legs; and
   height-adjustment means having a first end connected with the conveyance means and a second end connected with said bracket extending between said legs, wherein said height-adjustment means is moveable between an extended position and a retracted position, thereby adjusting a height of said first end of the frame by rotation of the frame relative to the legs.

2. A loading device according to claim 1, wherein said first end of said height-adjustment means is connected with said frame between the first end and second end thereof.

3. A loading device according to claim 1, wherein said first end of the frame is at a height substantially equal to the height of the second frame when said height adjustment means is in the extended position and said first end of the frame is at a height less than the height of the second end of the frame when said height adjustment means is in the retracted position.

4. A loading device according to claim 1, wherein said legs are fixed to a support surface.

5. A loading device according to claim 1, wherein said frame is supported solely by said legs and said height-adjustment means.

6. A loading device according to claim 1, wherein said frame further comprises:
   a pair of brackets extending downward from said pair of side rails, respectively; and
   a cross bar extending between the pair of brackets, wherein said height adjustment means is connected with the cross bar.

7. A loading device according to claim 1, wherein said conveyance means further comprises drive means for driving at least one of the first and second rollers.

8. A loading device according to claim 1, wherein said height adjustment means includes a hydraulic cylinder.

9. A loading device according to claim 1, wherein said height adjustment means includes a pneumatic cylinder.

10. A loading device according to claim 1, wherein said device further comprises a pump for moving said height adjustment means between the retracted position and the extended position.

11. A tunnel washer apparatus comprising:
    a washing chamber having a first end and a second end;
    a washer conveyor for conveying articles through the washing chamber from the first end to the second end thereof, said washer conveyor having a fixed height;
    spray means disposed with the washer chamber to spray fluid onto the articles being conveyed through the washing chamber by the washer conveyor, and
    a loading table disposed adjacent to the washer conveyor, said loading table comprising:
       conveyance means including:
          a frame having a first end and a second end, said frame including a pair of side rails having fixed length and a pair of transverse rails extending between the pair of side rails, wherein said frame has a fixed length between the first and second ends, first and second rollers supported by the frame, and a conveyor belt mounted around said first and second rollers to convey articles along a travel path extending between the first and second ends of the frame;

support means for supporting said conveyance means, the support means including:

a pair of stationary spaced-apart legs having a fixed height, said legs supporting the second end of the frame at a height substantially equal to a height of the washer conveyer, wherein the second end of the frame is pivotally connected with the legs, and a bracket extending between said legs; and height adjustment means having a first end connected with the conveyance means and a second end connected with said bracket extending between said legs, wherein said height-adjustment means is moveable between an extended position and a retracted position, thereby adjusting a height of said first end of the frame by rotation of the frame relative to the legs.

12. A tunnel washer apparatus according to claim 11, wherein said first end of said height-adjustment means is connected with said frame between the first end and second end thereof.

13. A tunnel washer apparatus according to claim 11, wherein said first end of the frame is at a height substantially equal to the height of the second frame when said height adjustment means is in the extended position and said first end of the frame is at a height less than the height of the second end of the frame when said height adjustment means is in the retracted position.

14. A tunnel washer apparatus according to claim 11, wherein said legs are fixed to a support surface.

15. A tunnel washer apparatus according to claim 11, wherein said frame is supported solely by said legs and said height-adjustment means.

16. A tunnel washer apparatus according to claim 11, wherein said frame further comprises:

a pair of brackets extending downward from said pair of side rails, respectively; and a cross bar extending between the pair of brackets, wherein said height adjustment means is connected with the cross bar.

17. A tunnel washer apparatus according to claim 11, wherein said conveyance means further comprises drive means for driving at least one of the first and second rollers.

18. A tunnel washer apparatus according to claim 11, wherein said height adjustment means includes a hydraulic cylinder.

19. A tunnel washer apparatus according to claim 11, wherein said height adjustment means includes a pneumatic cylinder.

20. A tunnel washer apparatus according to claim 11, wherein said device further comprises a pump for moving said height adjustment means between the retracted position and the extended position.

\* \* \* \* \*